US011352135B2

(12) United States Patent
McLean

(10) Patent No.: US 11,352,135 B2
(45) Date of Patent: Jun. 7, 2022

(54) TACTILE AND FORCE FEEDBACK IN VIRTUAL REALITY VIA DRONE

(71) Applicant: LENOVO Enterprise Solutions (Singapore) PTE. LTD., New Tech Park (SG)

(72) Inventor: James G. McLean, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 565 days.

(21) Appl. No.: 16/395,094

(22) Filed: Apr. 25, 2019

(65) Prior Publication Data
US 2020/0339258 A1 Oct. 29, 2020

(51) Int. Cl.
*B64C 39/02* (2006.01)
*G06F 3/01* (2006.01)
*G06T 19/00* (2011.01)

(52) U.S. Cl.
CPC .......... *B64C 39/024* (2013.01); *G06F 3/011* (2013.01); *G06F 3/016* (2013.01); *G06T 19/006* (2013.01); *B64C 2201/12* (2013.01); *B64C 2201/146* (2013.01)

(58) Field of Classification Search
CPC .............. B64C 39/024; B64C 2201/12; B64C 2201/146; G06F 3/011; G06F 3/16; G06T 19/006
See application file for complete search history.

(56) References Cited

U.S. PATENT DOCUMENTS

| | | | | |
|---|---|---|---|---|
| 9,169,030 B2 * | 10/2015 | Wong | ...................... | F21V 33/00 |
| 9,836,117 B2 * | 12/2017 | Shapira | ................... | G06F 3/011 |
| 10,362,299 B1 * | 7/2019 | Niemeyer | ............... | G06F 3/012 |
| 10,777,008 B2 * | 9/2020 | Chen | ....................... | G06F 3/016 |
| 2017/0193707 A1 * | 7/2017 | Seiler | ..................... | B64D 31/06 |
| 2019/0066359 A1 * | 2/2019 | Chen | ....................... | G06F 3/016 |
| 2020/0174570 A1 * | 6/2020 | Baughman | ............ | G06F 3/0346 |

OTHER PUBLICATIONS

Robin Ritz, "Cooperative Quadrocopter Ball Throwing and Catching—IDSC—ETH Zurich", Sep. 27, 2012, https://www.youtube.com/watch?v=hyGJBV1xnJI.
Sergei Lupashin, "Quadrocopter Ball Juggling, ETH Zurich", Mar. 28. 2011, https://www.youtube.com/watch?v=3CR5y8qZf0Y.
TED "Robots that fly . . . and cooperate | Vijay Kumar", Mar. 1, 2012, https://www.youtube.com/watch?v=4ErEBkj_3PY.

\* cited by examiner

*Primary Examiner* — Anne Marie Antonucci
*Assistant Examiner* — Patrick M Brady
(74) *Attorney, Agent, or Firm* — Kunzler Bean & Adamson; Bruce R. Needham

(57) ABSTRACT

An apparatus for providing tactile and force feedback in virtual reality via drone includes a processor and a non-volatile memory including code, where the code is configured to perform operations including: determining a parameter associated with a virtual interaction with a virtual reality object in a virtual reality environment; generating an instruction configured to cause a physical drone to simulate the virtual interaction using a physical interaction with the physical drone to provide physical feedback based on the parameter; and communicating the instruction to the physical drone. A method and system also perform the functions of the apparatus.

20 Claims, 9 Drawing Sheets

US 11,352,135 B2

TACTILE AND FORCE FEEDBACK IN VIRTUAL REALITY VIA DRONE

FIELD

The subject matter disclosed herein relates to virtual reality devices and more particularly relates to providing Tactile And Force Feedback In Virtual Reality Via Drone.

BACKGROUND

Virtual reality ("VR") devices and virtual reality environments are becoming more popular. Various VR input devices and gaming software being developed for the public. Some VR environments utilize high-resolution display optics and high-speed computing to provide a very realistic visual environment. Similarly, binaural audio can provide a convincing audio experience for VR users. Existing VR systems are limited regarding capabilities for realistically simulating real-world touch-related sensations such as air movement and/or impacts and interactions with objects. Some VR systems provide limited symbolic stimulus such as vibration to a user wearing or holding something that includes haptics. Haptics are typically turned on or off to provide short bursts of stimulus in response to input from VR software in a very generalized way that falls short of the real-world experience possible with audio and visual interaction in VR.

BRIEF SUMMARY

An apparatus for providing tactile and force feedback in virtual reality via drone is disclosed. A method and system also perform the functions of the apparatus. An apparatus includes a processor and a non-volatile memory including code, where the code is configured to perform operations including: determining a parameter associated with a virtual interaction with a virtual reality ("VR") object in a virtual reality environment; generating an instruction configured to cause a physical drone to simulate the virtual interaction using a physical interaction with the physical drone to provide physical feedback based on the parameter; and communicating the instruction to the physical drone.

A method for providing tactile and force feedback in virtual reality via drone is disclosed. The method determines a parameter associated with a virtual interaction with a VR object in a virtual reality environment, and generates an instruction configured to cause a physical drone to simulate the virtual interaction using a physical interaction with the physical drone to provide physical feedback on the parameter. The method communicates the instruction to the physical drone.

A system includes one or more physical drones corresponding to a VR object, one or more processors, and a memory storing code that is executable by the one or more processors to determine a parameter associated with a virtual interaction with the VR object in a virtual reality environment, to generate an instruction configured to cause the one or more physical drones to simulate the virtual interaction using a physical interaction with the one or more physical drones to provide physical feedback on the parameter, and to communicate the instruction to the one or more physical drones.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
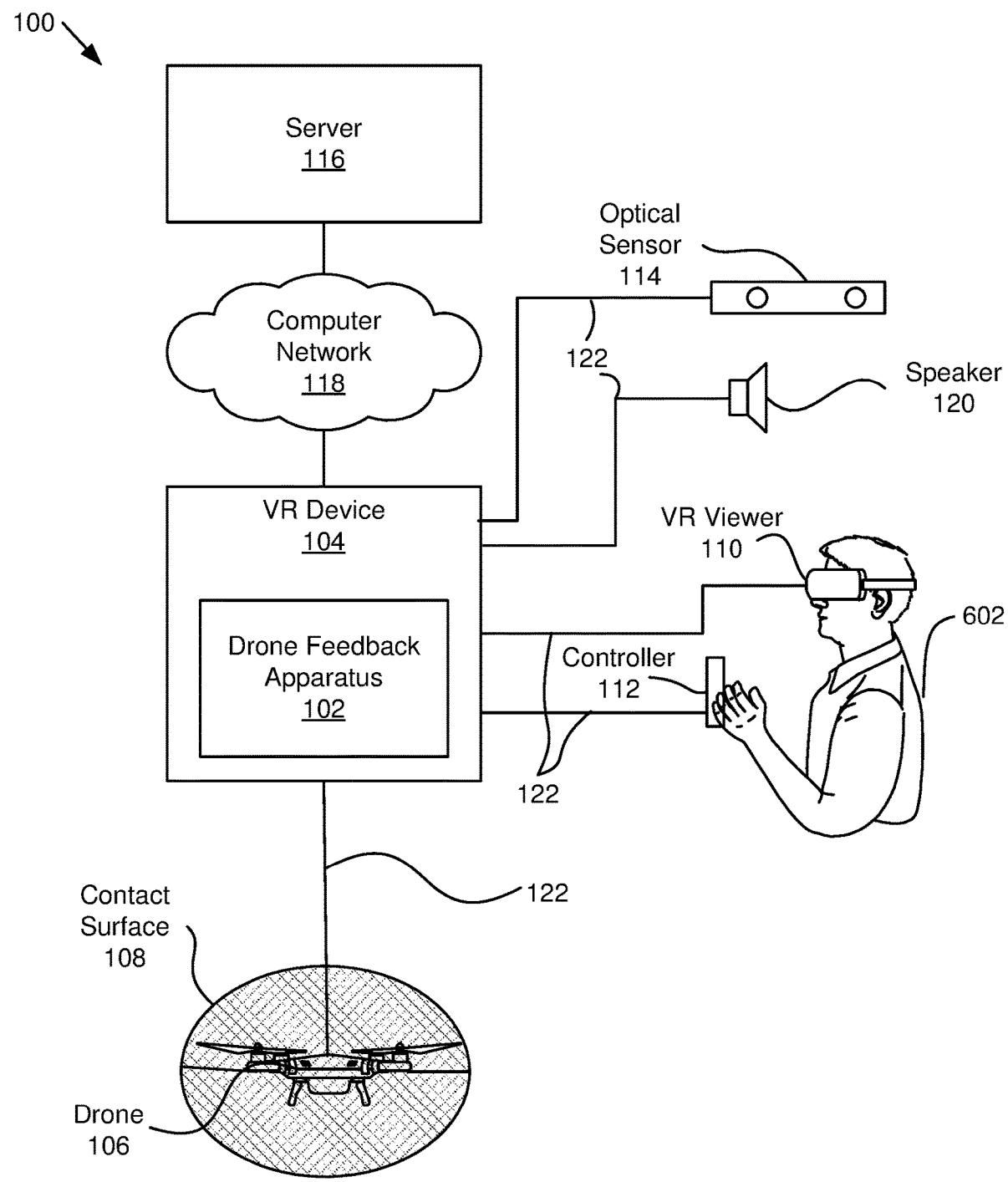
FIG. 1 is a schematic block diagram illustrating one embodiment of a system for providing tactile and force feedback in virtual reality ("VR") via drone.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus includes a processor and a non-volatile memory including code, where the code is configured to perform operations including: determining a parameter associated with a virtual interaction with a virtual reality ("VR") object in a virtual reality environment; generating an instruction configured to cause a physical drone to simulate the virtual interaction using a physical interaction with the physical drone to provide physical feedback based on the parameter; and communicating the instruction to the physical drone.

In some embodiments, the VR object is a first VR object and the parameter is for a virtual interaction between the first VR object and a second VR object and wherein the operations include determining a force parameter for a physical force to be exerted on a second physical object by the physical action of the physical drone where the second physical object corresponds to the second VR object. In certain embodiments, the second physical object is a physical user corresponding to a virtual reality character in the virtual reality environment. In other embodiments, the second physical object interacts physically with a physical user corresponding to a virtual reality character in the virtual reality environment. In certain embodiments, the operations include adjusting the force parameter for the physical force in accordance with an environmental input selected for the virtual reality environment. In various embodiments, the operations include determining a physical path for the physical drone that differs from a virtual path of the first VR object. In one embodiment, the drone is an unmanned aerial vehicle.

In some embodiments, the non-contact action includes a sensory effect selected from various effects such as wind effects, audio effects, and/or fluid effects. In one embodiment, the operations include coordinating the physical action of the physical drone with a similar physical action of a second drone. In some embodiments, the physical drone includes a contact surface that simulates a substantially continuous-feeling surface that corresponds to a virtual surface of the VR object. In certain embodiments, the operations include adjusting tactile characteristics of the contact surface.

A method includes determining a parameter associated with a virtual interaction with a VR object in a virtual reality environment. The method includes generating an instruction configured to cause a physical drone to simulate the virtual interaction using a physical interaction with the physical drone to provide physical feedback on the parameter, and to communicate the instruction to the physical drone. In certain embodiments, the VR object is a first VR object and the parameter is for a virtual interaction between the first VR object and a second VR object and the method includes determining a force parameter for a physical force to be exerted on a second physical object by the physical action of the physical drone where the second physical object corresponding to the second VR object. In various embodiments, the method includes adjusting the force parameter for the physical force in accordance with an environmental input selected for the virtual reality environment. In some embodiments, the method determines a physical path for the physical drone that differs from a virtual path of the VR object. In certain embodiments, the physical feedback is selected from a contact action and a non-contact action. In some embodiments, the non-contact action is a sensory effect selected from wind effects, audio effects, and/or fluid effects.

In various embodiments, the method coordinates the physical action of the physical drone with a similar physical action for a different physical drone. In certain embodiments, the method adjusts tactile characteristics of a contact surface to simulate a characteristic of a substantially continuous-feeling surface corresponding to a virtual surface of the VR object.

A system for tactile and force feedback in virtual reality via physical drones includes one or more physical drones corresponding to a VR object. In one embodiment, the system includes one or more processors and a memory storing code that is executable by the one or more processors to determine a parameter associated with a virtual interaction involving the VR object in a virtual reality environment, to generate an instruction configured to cause the one or more physical drones to simulate the virtual interaction using a physical interaction with the one or more physical drones to provide physical feedback on the parameter, and to communicate the instruction to the one or more physical drones.

FIG. 1 is a schematic block diagram illustrating one embodiment of a system 100 for providing tactile and force feedback in virtual reality ("VR") via drones. The system 100 includes one embodiments of a drone feedback apparatus 102 in a VR device 104, one or more drones 106, a VR viewer 110, a controller 112, an optical sensor 114, a server 116, a computer network 118, and a speaker 120, which are described below.

The term "virtual reality" as used herein refers generally to a computer-generated simulation of a three-dimensional simulated, emulated, and/or imagined environment that includes objects and/or settings that can be interacted with in a seemingly real physical way by a person using special electronic equipment, such as VR viewer 110 which typically includes a display screen inside and may include or connect in parallel with a one or more speakers 120 and/or a microphone for audio interaction in a virtual reality environment.

The system 100 provides significant improvements over existing VR technology by providing physical tactile and force feedback in VR via drones. The force feedback of the drone or drones can be used to push, pull, bump, hit, knock, stick, poke, jar, shake, jostle, nudge, butt, strike, collide with, skim into, jerk, jostle, and/or exert many other types of force. These forces may be exerted on a real person who is a VR user and/or on another physical object. It may be noted that the term "virtual reality" or "VR" as used herein is not intended exclude VR environments that include certain physical interactions and thus may include both virtual and physical interactions beyond sight and sound. Accordingly, the various embodiments described herein can also apply to and/or refer to virtual reality, mixed reality and/or augmented reality.

In one embodiment, the system 100 includes a drone feedback apparatus 102 that provides physical force and/or tactile feedback via one or more physical drones in a VR environment. In the embodiment, the drone feedback apparatus 102 determines a touch-related simulation parameter (or "parameter") associated with a virtual interaction involving a VR object in a virtual reality environment, generates an instruction configured to cause the one or more physical drones 106 (or "drones") to simulate the virtual interaction using a physical interaction with the physical drone to provide physical feedback on the parameter, and communicates the instruction to the one or more physical drones 106. The drone feedback apparatus 102 is described in more detail with respect to the apparatus 200 of FIG. 2 and the apparatus 300 of FIG. 3.

The system 100 includes a VR device 104. The VR device 104, in one embodiment includes the drone feedback apparatus 102. In various embodiments, one or more portions of the drone feedback apparatus 102 are located elsewhere, such as in the server 116. In one embodiment, the VR device 104 is part of the VR viewer 110. In the embodiment, one or more portions of the drone feedback apparatus 102 are part of the VR viewer 110. The VR device 104 is connected to the VR viewer 110 over a wireless or wired connection, either directly or over a computer network, such as the computer network 118 of the system 100 described herein. The VR device 104 may also be connected to a controller 112 through a wired or wireless connection 122. The VR device 104 may also be connected to the server 116 through the computer network 118 through a wired or wireless connection 122.

The wireless connection 122 may be a mobile telephone network. The wireless connection may also employ a Wi-Fi network based on any one of the Institute of Electrical and Electronics Engineers (IEEE) 802.11 standards. Alternatively, the wireless connection 122 may be a BLUETOOTH® connection. In addition, the wireless connection 122 may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection 122 may employ a ZigBee® connection based on the IEEE 802 standard. In one embodiment, the wireless connection 122 employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection 122 may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application. A person of ordinary skill in the art will recognize that although many of the connections depicted herein are beneficially wireless connections, reference to the wireless connection 122 may also refer to a wired connection in situations where a wired connection is suitable. For example, in certain embodiments, the optical sensor 114, the speaker 120, and/or other devices may connect to the VR device 104 through wired connections and/or wireless connections 122.

The VR device 104, in one embodiment, includes one or more processors, where processor may be a central processing unit ("CPU"), a multicore processor, and the like, and the VR device 104 may include memory, data storage, graphics processor, buses, and other typical computer processing components. The VR device 104 may be a game console, a desktop computer, a laptop computer, a tablet computer, and the like.

The VR device 104 may communicate with other VR devices (not shown), e.g., over the computer network 118 through the server 116. For example, VR environment may be a multiplayer game in which other players interface with the VR device 104 over the Internet or other computer network 118. In another example, the VR device 104 accommodates multiple users and each user has a VR viewer 110 and/or controller 112 connected to the VR device 104. One of skill in the art will recognize other functions and configurations of a VR device 104.

The system 100 includes one or more drones 106 (which may sometimes be referred to individually e.g., 106a, 106b, 106c, 106d). As used herein, the term "drone" refers to an unmanned aerial vehicle capable of operating autonomously from a human operator or under remote control of human operator and having a suitable size and capabilities for maneuvering within a room or other physical location for providing virtual reality simulations. In various embodiments, a drone 106a alone or operating in coordination with a different drone e.g., 106b corresponds to a VR object or multiple VR objects in a virtual reality environment.

In certain embodiments, the drone 106 includes a contact surface 108 that is substantially continuous-feeling and corresponds to a virtual structure of the VR object. In some embodiments, the substantially continuous-feeling contact structure encloses or partially encloses the drone 106. As used herein, the term substantially continuous-feeling contact surface refers to a contact surface 108 that allows sufficient airflow to permit the drone to maneuver aerially and is made of material having a sufficiently dense surface to prevent a user's fingers from penetrating the contact surface 108. In such embodiments, the contact surface 108 is substantially continuous-feeling to provide sufficiently realistic tactile feedback i.e., the contact surface 108 reasonably feels like the surface of the virtual object to which the drone corresponds. The contact surface 108 also provides a safety mechanism to prevent a user's fingers from contacting moving parts of the drone 106 such as propellers. Additional details regarding the contact surface 108 are described below with respect to FIGS. 4B, 7A, 7B and 9.

The system 100 includes a VR viewer 110 displays to the user a VR simulation. The VR simulation includes a visual environment within the field of view of the VR viewer 110 where the user may rotate the VR viewer 110 so that other parts and objects of the VR simulation come into view. In one embodiment, the VR simulation presents a three-dimensional environment to the user. In certain embodiments, the VR simulation also include sound, for example from the speaker 120 so that the VR viewer and the speaker provide visual and audio interaction with a user to simulate sights and sounds corresponding to virtual objects interacting in a virtual reality environment.

In some embodiments, the system 100 includes a controller 112 sometimes referred to as a game controller, joystick, peripheral, or similar term. In certain embodiments, the controller 112 may be held by the user. In other embodiments, the controller 112 may be worn by a user in a piece of clothing, a wristband, a breastplate, etc. In various embodiments, the system 100 may include more than one controller 112 such as for example a controller 112 that is held by the user and a different controller 112b that is a wearable device. In various embodiments, the controller 112 includes buttons, joysticks, triggers, or other input devices that allow the user to alter the virtual reality simulation.

In one embodiment, the user interacts with the virtual reality simulation by moving one or more body parts. Additionally, the controller 112 may include internal sensors such as accelerometers, RF sensors, switches, or other movement sensors that detect movement of the controller 112. For example, the controller 112 may represent a handheld object such as a golf club, drumstick, baseball bat, tennis racket, boxing glove, and so forth. Response to movement detected by the internal sensors of the controller, the VR simulation may depict movement linked to movement of the user holding the controller.

In some embodiments, the controller 112 may include a haptic device that can be turned on or off to provide bursts of stimulus that can be felt by the user. For example, some haptics use small motors that can be turned on or off to cause vibratory stimulus. such as an eccentric rotating mass vibration ("ERMV") motor, a linear resident actuator ("LRA") and/or a piezoelectric vibrating device. Such a haptic device may provide a touch-related stimulus to the user who is holding or wearing the haptic device. The haptic devices do not exert physical feedback such as contact force feedback or tactile feedback by command as the terms "force feedback" and "tactile feedback" are used herein. Rather, a device that includes haptics may be worn or held by a user, but the haptics exert only the momentary bursts of vibration. Similarly, the controller 112 or the wearable device mere exerts the fixed force of its own weight on the part of the user's body that is sustaining the device.

In certain embodiments, the system 100 includes one or more optical sensors 114 that detect movement of the user besides those movements detected by internal sensors within the controller 112. In some embodiments, the optical sensor 114 detects an identity of a user (e.g., by face recognition) or a position of the user. Input from the optical sensors may be fed into the VR device 104, which in response, generates a virtual movement that is linked to the movement of the user as detected by sensors within the controller 112 or as detected by the optical sensor 114.

The system 100 includes a server 116 connected to the VR device 104 over a computer network 118. The connection between the VR device 104 and the server 116 may be a wireless connection as described above or may be a physical connection (i.e. wired connection) that may include cables, fiber optics, or the like. The server 116, in one embodiment, includes one or more parts of the drone feedback apparatus 102. In another embodiment, the server 116 provides data storage, supporting calculations, or some other function useful to the VR device 104. In another embodiment, the drone feedback apparatus 102 is on the server 116. For example, an embodiment of the system 100 may not include the VR device 104 and the VR viewer 110, the controller 112, the speaker 120, etc. may connect directly to the server 116. In another embodiment, the server 116 is owned by a party that provides the VR simulation and sends software updates, data, etc. to the VR device 104, the VR viewer 110, and/or the controller 112. In another embodiment, the server 116 facilitates connection by other users for a multi-party VR simulation.

The server 116 may include rack mounted equipment in a data center, a rack mounted computer, a desktop computer, a workstation, a mainframe computer, a laptop computer, and the like. The server 116 may connect to other servers, to a storage area network, etc. One of skill in the art will recognize other forms and functions of a server 116 connected to the VR device 104.

The system 100, in one embodiment, includes a computer network 118. The computer network 118 is connected to the VR device 104, and possibly to other equipment, such as the VR viewer 110, the controller 112, other servers, a storage area network, etc. The computer network 118, in one embodiment, includes a digital communication network that transmits digital communications. The computer network 118 may include a wireless network, such as a wireless cellular network, a local wireless network, such as a Wi-Fi network, a Bluetooth® network, a near-field communication ("NFC") network, an ad hoc network, and/or the like. The computer network 118 may include a wide area network ("WAN"), a storage area network ("SAN"), a local area network ("LAN"), an optical fiber network, the internet, or other digital communication network. The computer network 118 may include two or more networks.

The computer network 118 may include one or more servers, routers, switches, and/or other networking equipment. The computer network 118 may also include one or more computer readable storage media, such as a hard disk drive, an optical drive, non-volatile memory, RAM, or the like. The computer network 118 may also include one or more wireless connections as described above. While the computer network 118 is depicted as a single computer network in FIG. 1, the system 100 may include a computer networks 118 that includes multiple computer network, which may be independent or may interact.

The system 100, in some embodiments, includes one or more speakers 120 that generate sound for the VR simulation. For example, the speakers 120 may be in the form of headphones that go in the ears of the user. In another embodiment, the speakers 120 may be in a room where the user is located. The sounds may be part of the VR simulation and may also include sounds associated with a virtual interaction, as explained below.

Figure 2:
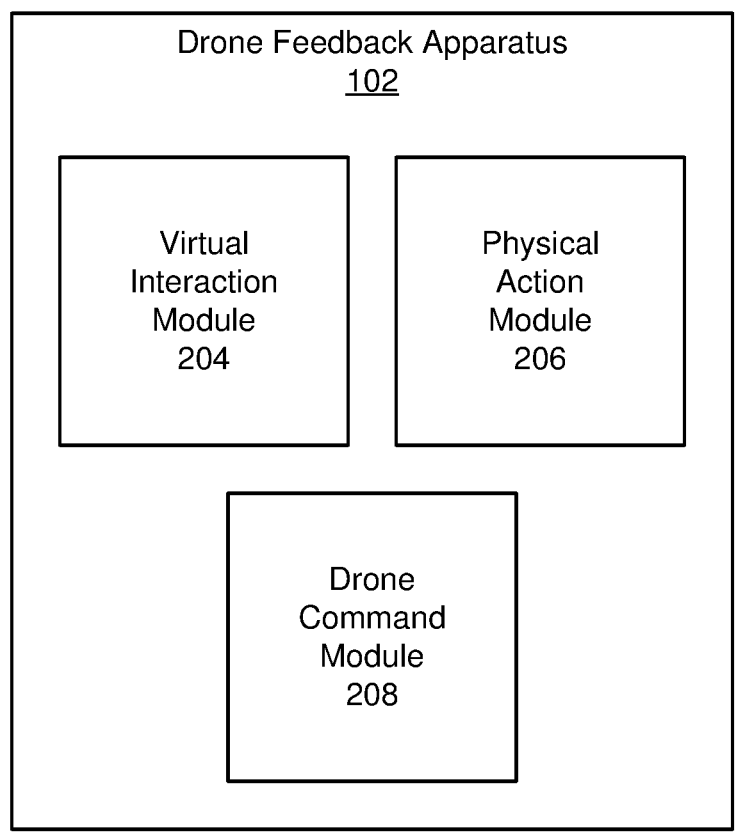
FIG. 2 is a schematic block diagram illustrating one embodiment of an apparatus for providing tactile and force feedback in VR via drone.

FIG. 2 is a schematic block diagram illustrating one embodiment of an apparatus 200 for providing tactile and force feedback in VR via drone. The apparatus 200 includes one embodiment of a drone feedback apparatus 102 with a virtual interaction module 204, physical action module 206, and drone command module 208, which are described below. In one embodiment, the modules described herein are implemented using a processor and a non-volatile memory including code, where the code is configured to perform operations as described with respect to the respective modules. As used herein, where an apparatus (including a module implemented using a processor and non-volatile memory including code) is described using an active verb form as performing an operation, the description and relevant claims are to be understood as describing and claiming apparatuses that are configured to perform the operation whether or not the operation has been actively performed at any particular point in time.

The apparatus 200 includes a virtual interaction module 204 that determines touch-related simulation parameters associated with a virtual interaction with a VR object in a virtual reality environment. In various embodiments, as used herein, the term "virtual interaction" with reference to a "virtual reality environment" may refer to one or more events involving virtual objects (and in some embodiments also including real objects) in a VR game, a VR simulation, a VR simulation, a VR scenario, a VR interactive tour, or similar settings, including mixed reality settings and/or augmented reality settings.

In some embodiments, touch-related simulation parameters include tactile and force related parameters such as weight, momentum, force magnitude, force direction, texture, softness, rigidity, texture, smoothness, shape, gravitational acceleration force for the VR environment, buoyancy, or any parameter of physics capable of being modeled in a simulation and useful for providing feedback that could be perceived by a user's sense of touch or by a modeled response of the VR object, which may be a first VR object, interacting with the second VR object. One of skill in the art will recognize other touch-related simulation parameters for a particular VR environment.

In certain embodiments, the second physical object is a physical user corresponding to a virtual reality character in the virtual reality environment. In other embodiments, the second physical object interacts physically with a physical user corresponding to a virtual reality character in the virtual reality environment.

For example, consider a virtual interaction that involves a first VR object such as, a rock, a basketball, a pillow, a helium balloon, and so forth, being picked up, held, and/or moved by a second VR object such as a player or character in a VR game. In existing VR systems, the second VR object, e.g., the player, may interact with the first VR object e.g., the rock, the basketball, the pillow, or the helium balloon, etc., by pantomiming a lifting or carrying motion with an empty hand, a gloved hand, or a hand holding a controller. The motion is sensed by the VR device, for example by sensors in a controller 112, a position or optical sensor in a VR viewer 110 or an optical sensor 114. The VR device may sense the speed of such motion and may simulate a response based on the sensed speed. However, existing VR systems do not provide physical feedback based on the touch-related simulation parameters. The weight of the player's empty hand or of the hand holding the controller 112 does not vary for the different virtual interactions involving the rock, the basketball, the pillow, or the helium balloon.

In various embodiments, the virtual interaction module 204 significantly improves the system 100 and/or the VR device 104 by determining touch-related simulation parameters for the virtual interaction involving the VR object in a virtual reality environment. In one embodiment, the virtual interaction module 204 generates a query to a database of virtual object characteristics which provides various touch-simulation specifications for the virtual object such as weight, size, shape, hardness, and/or texture. The database may be stored in a memory of the apparatus 200 or may be retrieved from the server 116 over the computer network 118.

The apparatus 200 includes a physical action module 206 that generates an instruction configured to cause a drone 106 to simulate the virtual interaction using a physical interaction with the physical drone to provide physical feedback on the parameter.

In some embodiments, the physical action module 206 generates an instruction that is a compound instruction or a complex combination of instructions. In one example, in response to a virtual interaction in which the second VR object e.g., the virtual character, picks up the first VR object e.g., a virtual rock, the virtual interaction module 204 determines a touch-related simulation parameter for the virtual rock such as the weight of the rock.

The physical action module 206 generates an instruction for a physical action for the drone corresponding to the first VR object (e.g., the rock) for providing physical feedback (e.g., a downward force based on the weight of the rock) via the drone 106 acting on a second physical object e.g., the player's hand corresponding to the second VR object e.g., the virtual character's hand, where the physical feedback (e.g., the weight, size, hardness, etc. of the rock) is based on the touch-related simulation parameter for the virtual interaction. Assuming in the example that the physical drone weighs less than a simulation weight parameter for the virtual rock as determined by the virtual interaction module 204, the physical action module 206 generates an instruction for the drone 106 to propel itself downward with a force suitable to simulate the weight of the virtual rock.

In a different example, in response to a virtual interaction in which the second VR object e.g., the virtual character, picks up the first VR object e.g., a helium balloon, the virtual interaction module 204 determines a touch-related simulation parameter for the virtual helium balloon such as the buoyancy of the helium balloon in air. The physical action module 206 then generates an instruction for a physical action for the drone corresponding to the first VR object (e.g., the virtual helium balloon) for providing physical feedback (e.g., the upward force of the helium balloon)

based on the touch-related simulation parameter (e.g., the helium balloon's buoyancy in air) for the virtual interaction. Using a simulation parameter for simulating the buoyancy of the balloon in air as determined by the virtual interaction module 204, the physical action module 206 generates an instruction for the drone 106 to propel itself upward with the force suitable to simulate the buoyancy of the helium balloon.

In certain embodiments, the physical action for the drone may be a contact action or a noncontact action. A "contact action" as used herein is an action which the drone 106 which corresponds to the first VR object provides physical feedback via the drone 106 making physical contact with the second physical object e.g., the physical user or player corresponding to the VR character in some embodiments. "Making contact" by the drone includes any contact made by: the drone 106 itself, a portion of the drone 106, and/or any accessory such as an appendage, a shell, a line, an enclosure, a partial enclosure, and so forth which is coupled to the drone 106.

In some embodiments, the drone 106 makes physical contact with a second physical object e.g., a ball, another drone, a target, and so forth) that interacts physically with the physical user corresponding to a virtual reality character in the virtual reality environment. Examples of the physical action module 206 generating instruction for non-contact physical action for drone 106 are provided below with respect to the apparatus 300 of FIG. 3, apparatus 500 of FIG. 5, apparatus 600 of FIG. 6A,6B and apparatus 800 of FIG. 8.

The apparatus 200 includes a drone command module 208 that communicates the instruction to the drone 106, which causes the drone to perform the physical actions. In some embodiments, the drone command module 208 includes a wireless interface that communicates the instruction for physical action to the drone 106. In various embodiments, the drone command module 208 communicates the instruction to the drone 106 are by sending and/or analog signals or messages to the drone which are decoded which cause different mechanical elements of the drone 106 such as different motors driving different rotors of a multi-rotor drone e.g., a quadcopter-type drone to propel itself upward, downward, sideways or in any direction with the predetermined speed, path, thrust, and so forth.

As the drone command module 208 causes the drone to perform the physical actions, the apparatus 200 provides physical feedback by the drone 106 (which corresponds to the first VR object e.g., the rock, the balloon, etc.) acting on the second physical object (e.g., the physical player's hand) corresponding to the second VR object (e.g., the virtual character's hand) thereby significantly improving the functionality and operation of the system 100 and/or the VR device 104 to provide more realistic virtual reality interactions than are available with existing systems.

These simplified examples illustrate the beneficial improvements of the drone feedback apparatus for providing tactile and force feedback via drone in a virtual reality environment. Additional examples illustrating the structures and functions of the virtual interaction module 204 and the physical action module 206 are described below with respect to FIGS. 3, 4A, 4B, 5, 6A, 6B, 7, 8, 8, 9A and 9B.

Figure 3:
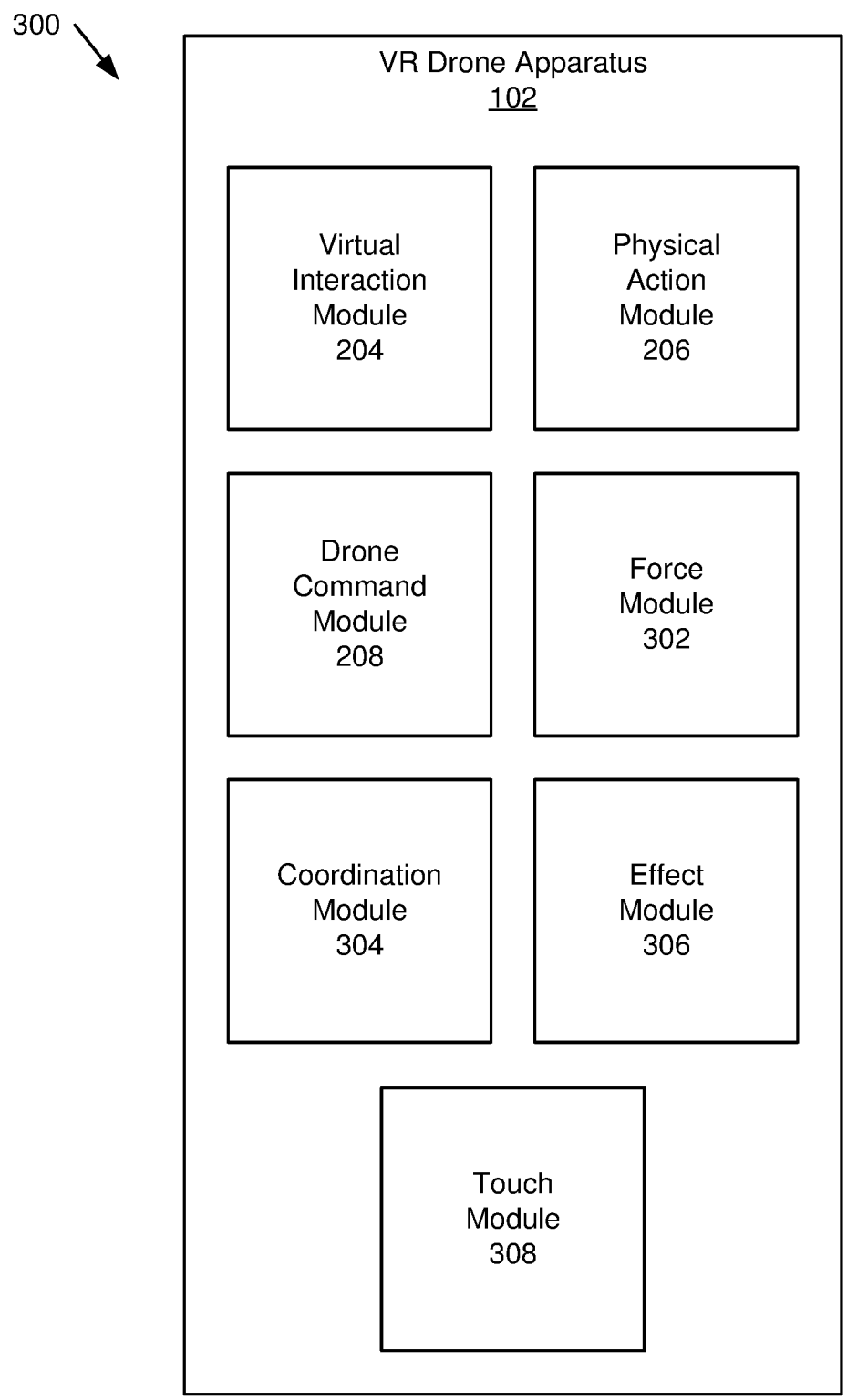
FIG. 3 is a schematic block diagram illustrating another embodiment of an apparatus for providing tactile and force feedback in VR via drone.

FIG. 3 is a schematic block diagram illustrating another embodiment of an apparatus 300 for providing tactile and force feedback in VR via drone. The apparatus 300 includes another embodiment of a drone feedback apparatus 102 with a virtual interaction module 204, a physical action module 206, and a drone command module 208, which are substantially similar to those described above with respect to the apparatus 200 of FIG. 2. The apparatus 300, in some embodiments, includes a force module 302, a coordination module 304, in effect module 306, and/or a touch module 308, which are described below.

The apparatus 300 includes, in some embodiments, a force module 302 that determines a force parameter for a physical force to be exerted on the second physical object by the physical action of the drone. The two examples described above with respect to apparatus 200 of FIG. 2 in which the drone simulates the weight of a rock and/or a helium balloon illustrate one type of force parameter for physical force to be exerted on the second physical object e.g., the physical user, by the physical action of the drone 106 propelling itself downward to simulate the force of the weight of the rock acting on the hand of the user and propelling itself upward to simulate the force of the buoyancy of the helium balloon acting on the hand of the user.

Figure 4A:
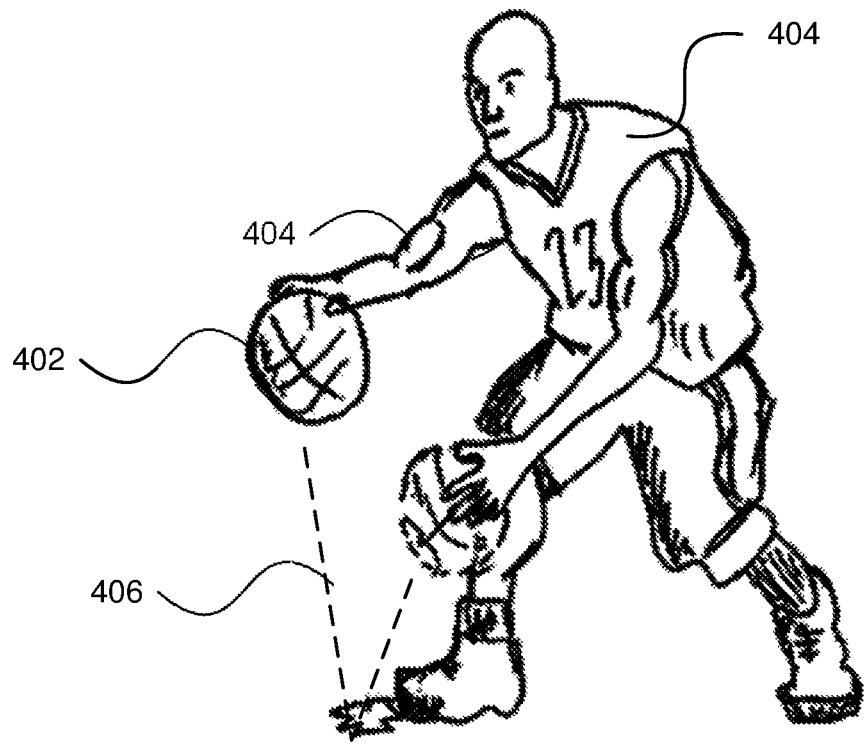
FIG. 4A is a schematic block diagram illustrating a virtual interaction between a first VR object and a second VR object.

For example, referring to FIG. 4A which is a schematic block diagram illustrating an example of virtual interaction between a first VR object 402 and a second VR object 404 in a VR environment. The virtual interaction depicted in FIG. 4A is a first-person basketball simulation game. The first VR object 402 is a simulated basketball. The second VR object 404 is a virtual player that is dribbling the "basketball" which is bouncing off the floor with convincing graphics and sound. The first VR object 402 is a virtual path 406 which it travels as it bounces from the virtual player's right hand to the floor and bounces back up to the virtual player's left hand.

Figure 4B:
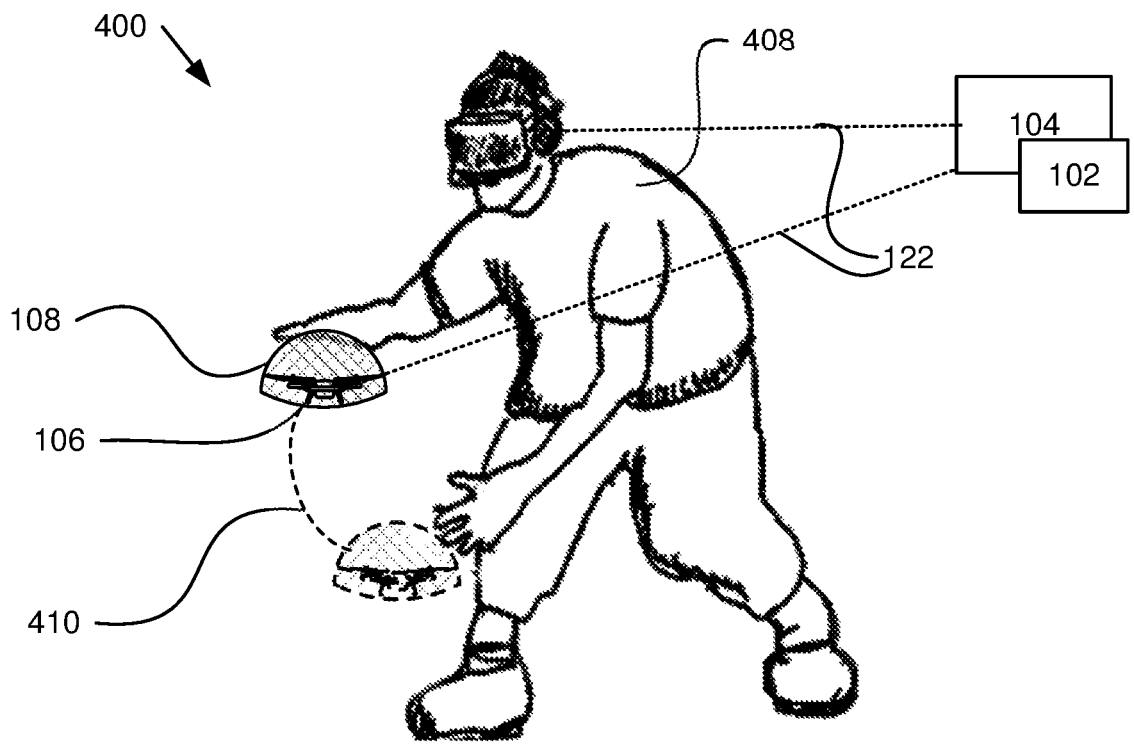
FIG. 4B is a schematic block diagram illustrating an embodiment of providing physical feedback in a VR via drone corresponding to the first VR object of FIG. 4A.

FIG. 4B depicts an apparatus 400 in which various physical objects provide tactile and force feedback corresponding to interactions between virtual objects in the VR environment of FIG. 4A and provide tactile and force feedback in a VR environment. The apparatus 400 includes a VR device 104 with one embodiment of a drone feedback apparatus 102 substantially similar to the apparatus 200 of FIG. 2 and the apparatus 300 of FIG. 3.

In one embodiment, the apparatus 400 includes a virtual interaction module 204 that determines a touch-related simulation parameter for a virtual interaction involving the first VR object 402 e.g., the basketball and the second VR object e.g., the virtual character 404 e.g., a basketball player. For example, one-touch related simulation parameter may be the trajectory or virtual path 406 of the virtual basketball 402 as it bounces from the virtual player's right hand to the floor to the left hand of the virtual player.

The apparatus 400 includes a physical action module 206 that generates instruction for physical action for drone 106 corresponding to the first VR object e.g., the basketball for providing physical feedback e.g., force feedback by the drone 106 while six acting on the second physical object e.g., the physical user 408 corresponding to the second VR object 404 e.g., the virtual basketball player. In some embodiments, the apparatus 400 includes a force module that determines a force parameter for physical force e.g., the speed and momentum of the virtual basketball to be exerted on the physical user by the physical action of the drone 106. In some embodiments, the physical action module 206 generates an instruction for the drone 106 to emulate the virtual action of the first VR object e.g., the virtual basketball for example by instructing the drone 106 to perform a movement along a physical path (not shown) that mimics the virtual path 406 of the virtual basketball.

In other embodiments as depicted in FIG. 4B, the physical action module 206 generates an instruction for a physical action for drone 106 to simulate the balance of the basketball by performing a movement along the physical path 410 that differs from the virtual path of the virtual basketball. A drone command module 208 communicates the instruction to the drone 106 causing the drone 106 to perform the physical action or actions. In other words, the drone 106 exerts an upward normal force on the physical user's hand to provide a similar resistance to that which would be experienced by a real basketball player balancing a real basketball and in response to a downward force exerted by the physical user's hand, the drone 106 moves to the location provided by the instruction of the physical action module 206 but may follow a different path and still arrive at the right time to provide force feedback simulating that of a balancing basketball on the left-hand of the physical user 408.

Also, as depicted in FIG. 4B, the drone 106 may include a contact surface 108 that simulates a substantially continuous-feeling surface corresponding to a virtual surface of the first VR object e.g., the basketball. For example, in some embodiments, the contact surface 108 is a mesh surface that allows airflow through the mesh and at the same time simulates a substantially continuously feeling surface like that of a basketball. In other embodiments, the contact surface 108 is a textured film or foil stretched over a framework that is coupled to the drone 106 using structural members that sufficiently space the contact surface 108 from the rotors of the drone 106 to permit airflow.

In various embodiments, the force module 302 adjusts the force parameter for the physical force in accordance with an environmental input selected for the virtual reality environment. As used herein, an environmental input may be any input for the VR environment that that would influence it a touch-related parameter. In certain embodiments for example, the weight of a virtual object as perceived by VR user's sense of touch, depends on the acceleration due to gravity in the environment, the buoyancy of the object and its surrounding environmental media, etc.

For example, in VR simulation of a virtual interactions on the moon, the acceleration force exerted on an object due to gravity is less than the acceleration force exerted on an object due to gravity on the earth. Accordingly, in such embodiments, the force module 302 adjusts the force parameter in accordance with the environmental input e.g., the acceleration force due to gravity on the moon and the amount of force exerted by the drone 106 propelling itself downward to simulate the weight of a particular object would be correspondingly lessened. In other embodiments, in embodiments for example, in which a VR simulation involves a virtual interaction in water, the force module 302 adjusts the amount of force exerted by the drone 106 acting on the second object in accordance with an environmental input such as viscosity, buoyancy, etc., for the virtual reality environment simulating a water environment.

The apparatus 300 includes, in various embodiments, a coordination module 304 that enables the physical action module 206 and the drone command module 208 to coordinate the physical action of the drone 106 (e.g., 106a) with a similar physical action of a different drone (e.g., 106b). The term "similar" with regard to a physical action of a drone 106 means an action that objectively resembles, complements, and/or coordinates with but does not require that the physical action be of the same type, same direction, same speed and so forth.

Figure 5:
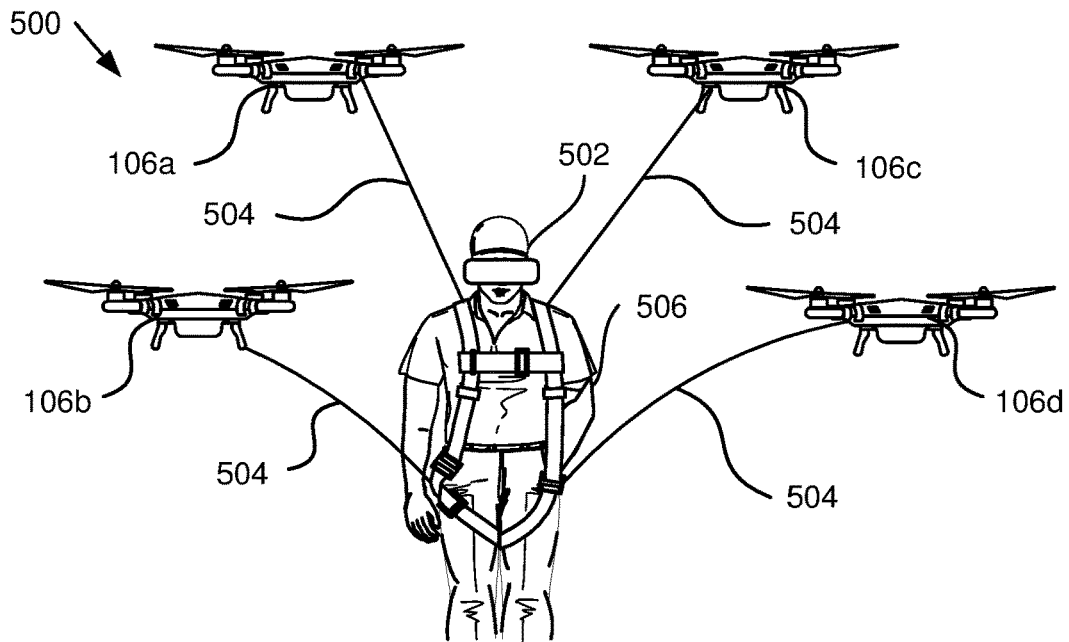
FIG. 5 is a schematic block diagram illustrating an example of providing tactile and force feedback in VR by coordinating a non-contact physical action of a drone with a similar physical action of different drones.

For example, FIG. 5 is a schematic block diagram illustrating one embodiment of an apparatus 500 for providing tactile and force feedback in a virtual reality environment via coordinated non-contact action of several drones 106a, 106b, 106c, 106d corresponding to a first virtual reality object to produce an effect on a second virtual reality object e.g., a virtual character corresponding to a physical VR user 502.

The apparatus 500 includes in one embodiment, a coordination module 304 that enables the physical action module 206 and the drone command module 208 to coordinate the physical action of the drone 106a with a similar physical action of different drones (e.g., 106b, 106c, and 106d). In such an embodiment, in response to environmental input such as a lesser acceleration due to gravity, as described above, the drones 106a, 106b, 106c and 106d coordinate the physical action of propelling themselves generally upward.

The drones 106a, 106b, 106c and 106d propel themselves with slightly different trajectories as determined by the virtual interaction module 204 and the physical action module 206 acting in coordination by the coordination module 304 so as to exert a force having a predetermined magnitude in predetermined directions on the second object e.g., the VR user, for example through cables/ropes 504 that are coupled to a harness 506 worn by the physical VR user 502 so as to simulate the lower force gravity on the physical VR user 502 in the VR environment. The physical actions of the drones 106a, 106b, 106c, 106d pulling in different directions with perhaps different forces objectively resemble each other and are similar.

Figure 6A:
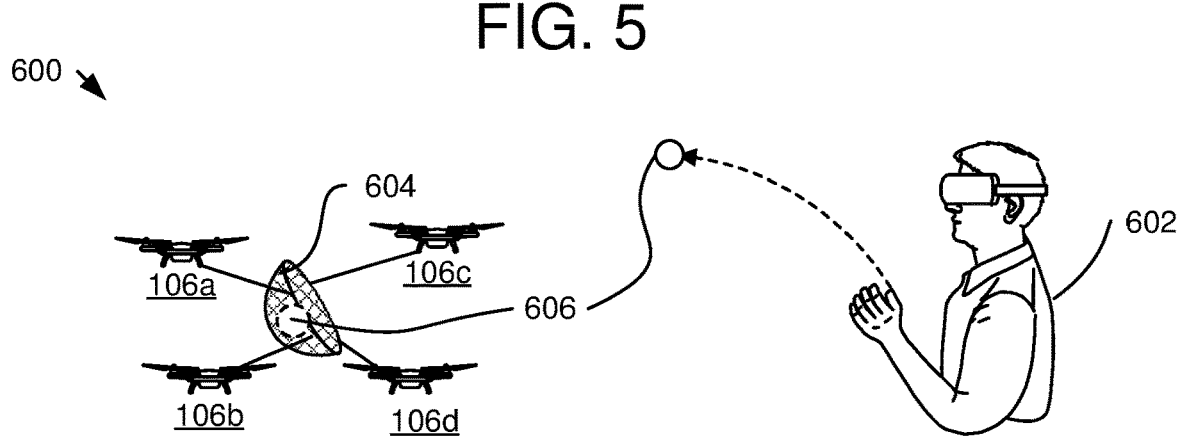
FIGS. 6A and 6B are schematic block diagrams illustrating an example of providing physical feedback in a virtual reality environment via coordinating non-contact actions of drones corresponding to a first virtual reality object to produce an effect on a second virtual reality object.
Figure 6B:
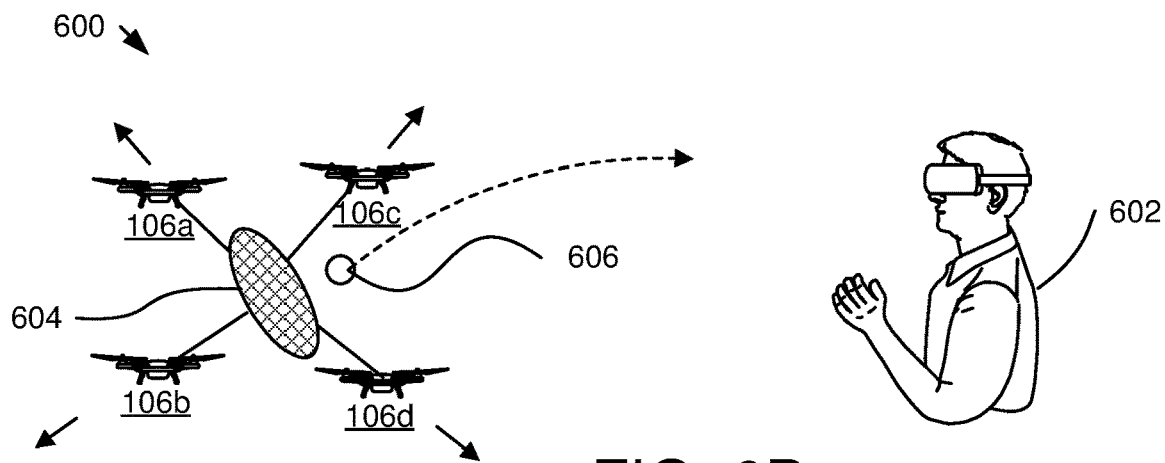

In another example, FIGS. 6A and 6B are schematic block diagrams illustrating another embodiment of an apparatus 600 for providing tactile and force feedback in VR by coordinating a physical action of a drone with a similar physical action of a different drone. The apparatus 600 includes in one embodiment, a coordination module 304 that enables the physical action module 206 and the drone command module 208 to coordinate the physical action of the drone 106a with a similar physical action of different drones e.g., 106b, 106c, and 106d). In certain embodiments, the second physical object is an inanimate object that the drone acts upon in response to a predetermined virtual action. In the embodiment, the virtual interaction module 204 determines a virtual interaction such as tossing a ball to a virtual character corresponding to a physical user 602.

In this example, the apparatus 600 also involves a virtual interaction between first VR object and a second VR object that is an inanimate object. The first VR object is a throwing arm of different virtual character in the VR environment other than the VR character corresponding to the physical user 602. The first physical object corresponding to the first VR object is a net 604. The second virtual object is a ball and the second physical object corresponding to the second VR object is a physical ball 606 that is thrown back and forth between the drones 106a-106d simulating the throwing arm of the different virtual character and the virtual character corresponding to the physical user 602.

In other words, the apparatus 600 causes the coordinated actions of the drones 106a, 106b, 106c, and 106d to simulate the action of the different virtual character throwing the virtual ball to the virtual character corresponding to the physical user 602. The coordination module 304 enables the virtual interaction module 204, the physical action module 206, and the drone command module 208 to cause the drones 106a, 106b, 106c, and 106d to propel themselves outwardly in different directions so as to snap the net 604 thereby simulating the virtual interaction between the different virtual character a virtual character corresponding to the physical user 602.

Figure 7:
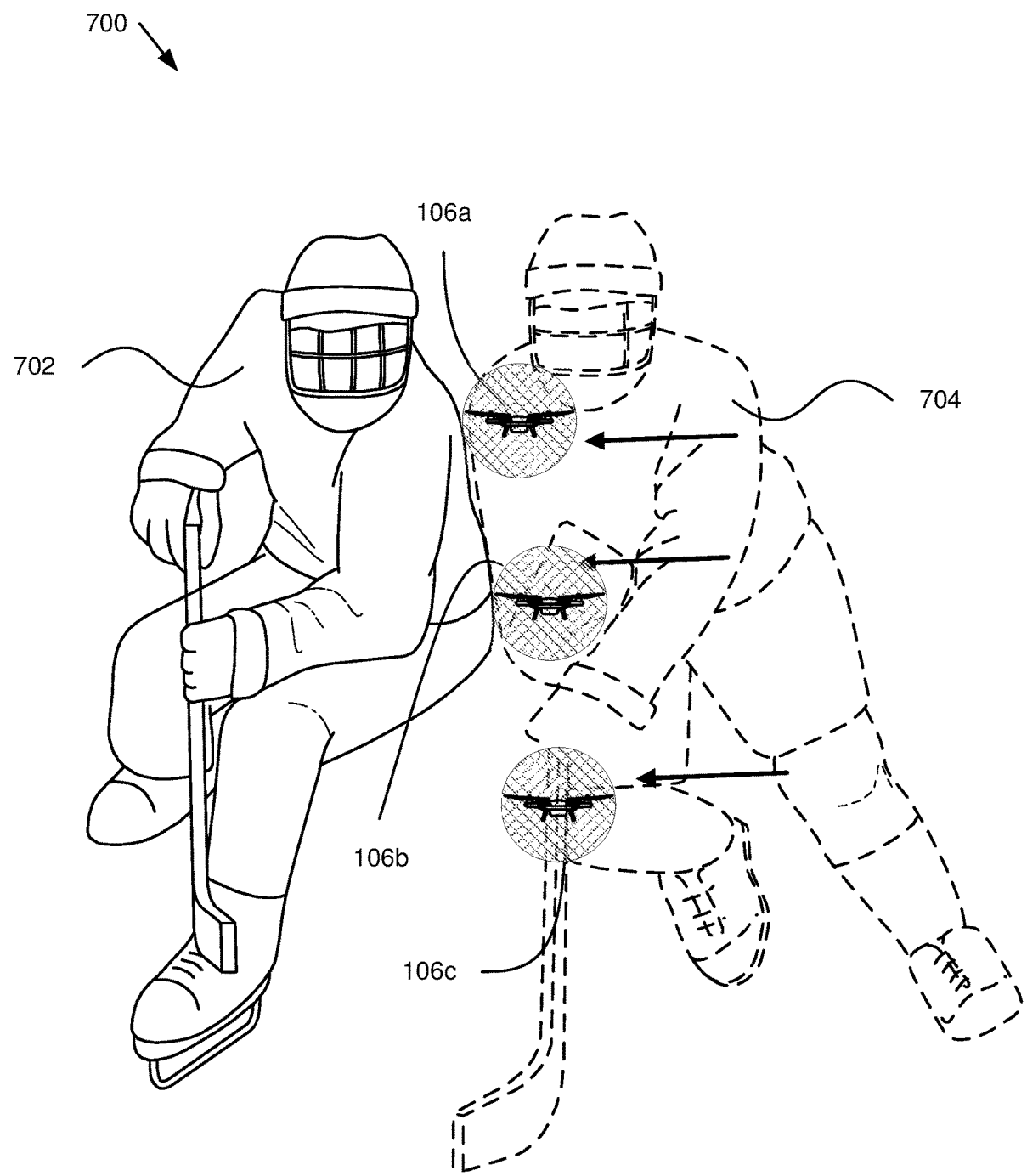
FIG. 7 is a schematic block diagram illustrating an example of providing physical feedback in a virtual reality environment via coordinating contact actions of drones corresponding to a first virtual reality object to produce an effect on a second virtual reality object.

FIG. 7 is a schematic block diagrams illustrating another embodiment of an apparatus 700 for providing tactile and force feedback via drone in VR by coordinating a physical action of a drone with a similar physical action of a different drone. The apparatus 700 is substantially similar to the apparatus 300 described above with respect to FIG. 3 and includes a coordination module 304. In the example of FIG. 7, the virtual interaction involves a first VR object 704 e.g., a virtual hockey player and a second VR object e.g., a different virtual character corresponding to the physical user 702. The coordination module 304 enables the virtual interaction module 204, the physical action module 206, the drone command module 208, and the force module 302 to coordinate the respective physical actions of the drones 106a, 106b, and 106c. The force module 302 determines force parameters for physical force to be exerted by the drones 106a, 106b, and 106c acting on the second physical object e.g., the respective body parts (e.g., shoulder, elbow, and knee) of the physical user 702 so as to simulate the action of the virtual hockey player bumping into the different virtual character corresponding to the physical user 702. The above examples are merely illustrative of the improvements to the art technology enabled by various modules of the apparatus 300 including the coordination module 304 and one of skill in the art will recognize other applications of coordinating the physical actions of the drone 106a with the different drone e.g., 106b, 106c, 106d, etc.

Figure 8:
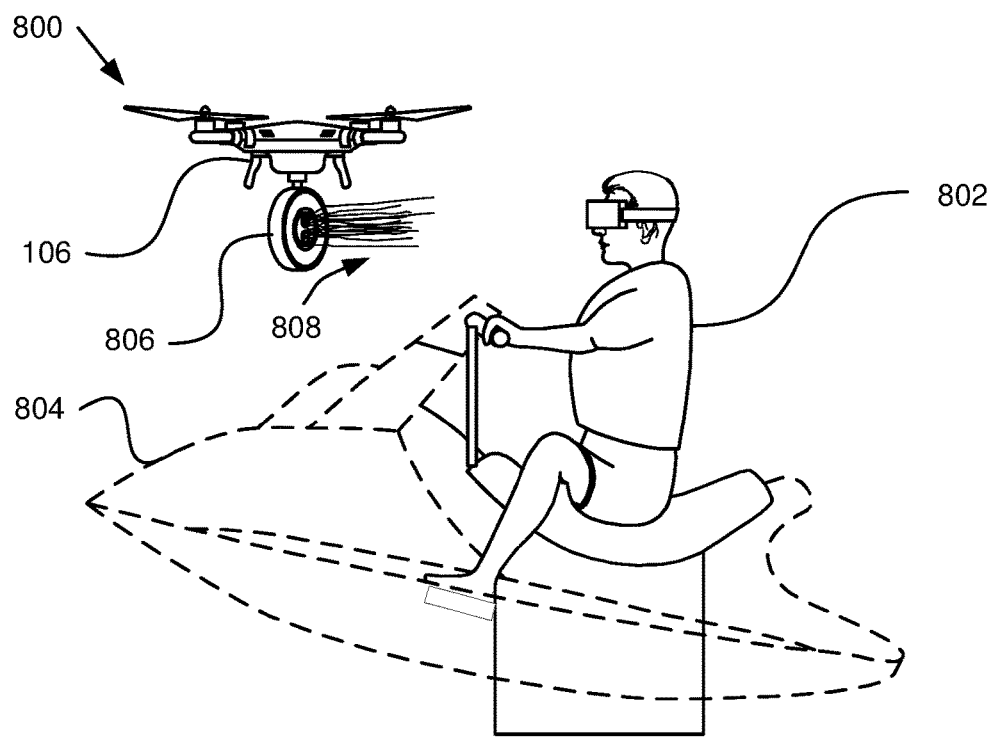
FIG. 8 is a schematic block diagram illustrating an apparatus for providing a non-contact touch-related effect via drone.

The apparatus 300 includes in one embodiment, an effect module 306 that generates a noncontact action to produce an effect selected from wind effects, audio effects, fluid effects, etc. To illustrate certain structures and functions of the effect module 306, FIG. 8 is a schematic block diagram illustrating one embodiment, of an apparatus 800 for providing touch-related feedback in a virtual reality environment via a non-contact action of a drone 106 corresponding to a first virtual reality object. The apparatus 800 in one embodiment of the apparatus 300 including effect module 306. The virtual interaction involves a first VR object 804 e.g., a virtual personal watercraft and a second VR object a virtual character corresponding to a physical user 802 in the simulation are involving the virtual character riding over a body of water on the virtual personal watercraft.

In this example, the drone feedback apparatus 102 utilizes the virtual interaction module 204, the physical action module 206, the drone command module 208, the force module 302 and the effect module 306 to cause the drone 106 to perform a physical action of blowing mist-filled air 808 toward the physical VR user 802 (e.g., using a misting fan 806 coupled the drone 106 or using a misting device to create mist that is blown by propellers of the drone 106) to produce a combination of wind effects and fluid (e.g., water) effects so as to simulate a non-contact effect similar to the physical effect spray-filled wind blowing towards a person using a personal watercraft on a body of water. In some embodiments, the fluid carried and dispersed by the drone 106 may include scents which can be dispersed by the drone 106 to create a VR environment having a predetermined smell or combination of smells thus further enhancing the VR experience of the physical VR user 802.

One of ordinary skill will recognize that the effect module 306 can generate other types of noncontact action to produce other effects such as for example, tuning the frequency of motors of the drone 106 to simulate an audio effect of a noise associated with revving an engine of a virtual motorcycle, car, speedboat, etc. in certain embodiments, the drone 106 may also include a speaker and a wireless transceiver coupled to the speaker whereby, the drone 106 may perform a non-contact physical action of broadcasting sound of a predetermined nature to a physical user from a particular location of the drone 106.

Figures 9A, 9B:
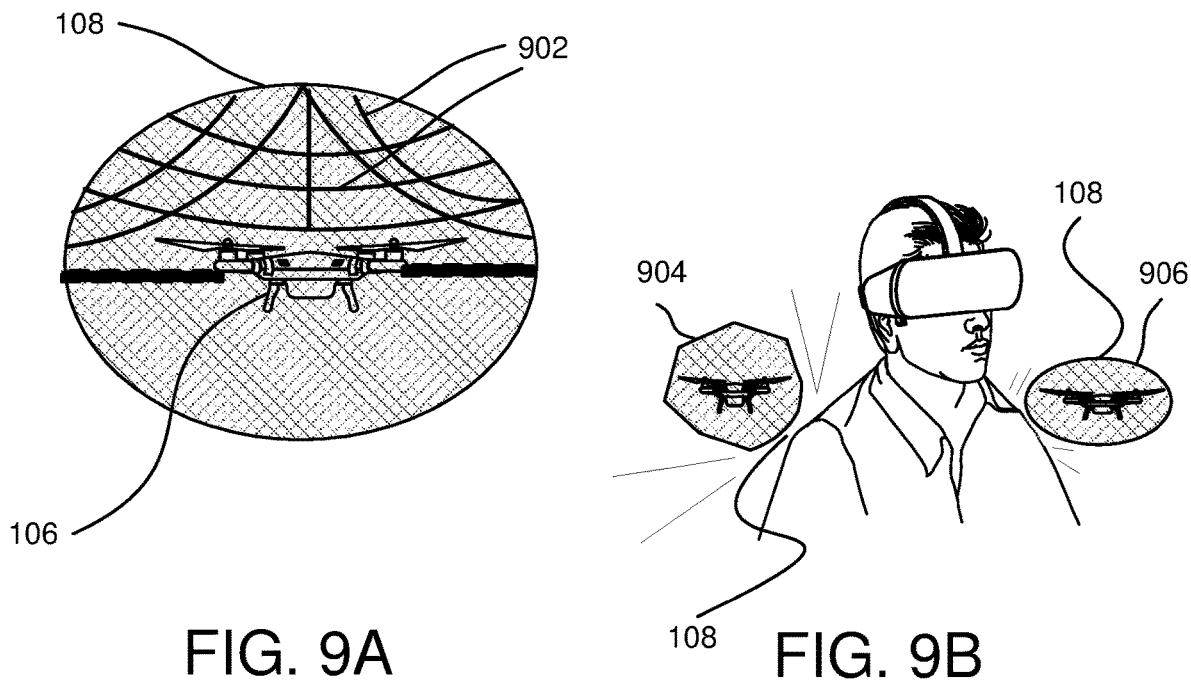
FIG. 9A is a schematic block diagrams illustrating providing tactile feedback via a drone having a contact surface that simulates a substantially continuous-feeling surface corresponding to a virtual surface of the first VR object.
FIG. 9B is a schematic block diagrams illustrating adjusting tactile characteristic of a contact surface of a drone for providing tactile feedback in a VR environment.

In various embodiments, the drone 106 includes a substantially continuous feeling contact surface the corresponds to a virtual surface of a VR object. Referring again to FIG. 3 using an example depicted in FIGS. 9A and 9B, the apparatus 300 includes a touch module 308 that adjusts tactile characteristics of the contact surface 108. FIG. 9A is a schematic block diagrams illustrating providing tactile feedback via a drone having a contact surface 108 that simulates a substantially continuous-feeling surface corresponding to a virtual surface of the first VR object.

FIG. 9A depicts a drone 106 that is enclosed or partially enclosed in an enclosure that has a substantially continuous feeling contact surface that allows airflow to propellers of the drone 106. Depending on the nature of the virtual interaction, the contact surface 108 need not completely enclose the drone 106 for example, the contact surface 108 may be a thin metal foil or polymeric film over a lightweight framework 902 that that includes sufficient space between the propellers of the drone 106 and the lightweight framework 902 for air to flow under and around the propellers through an opening in a part of the lightweight framework 902 that is not covered by the metal foil or polymeric film. As explained above with respect to FIG. 1, as used herein, the term "substantially-continuous feeling" refers to a contact surface that is sufficiently continuous so as to prevent objects such as a VR user's fingers from penetrating the contact surface thereby providing tactile feedback corresponding at least to some degree to the tactile feedback that the physical object being simulated in the virtual reality environment would provide.

FIG. 9B is a schematic block diagrams illustrating adjusting tactile characteristic of a contact surface 108 of a drone 106 for providing tactile feedback in a VR environment In various embodiments, the apparatus 900 includes a touch module 308 that adjusts tactile characteristics of the contact surface 108 so as to tighten or relax the mash, film, or other surface. In certain embodiments, the contact surface of the drone 106 is stretched over a lightweight framework 902 that includes electromechanical structures, such as for example, a nickel-titanium alloy ("Nitinol®") fabric or film coupled to Nitinol® wires or miniature winches that tighten or relax wires or lines whereby the contact surface may be tightened around the framework to simulate the tactile characteristics of a harder object such as a rock 904 or relaxed to simulate the tactile characteristic of a softer object such as a balloon or a pillow 906.

Figure 10:
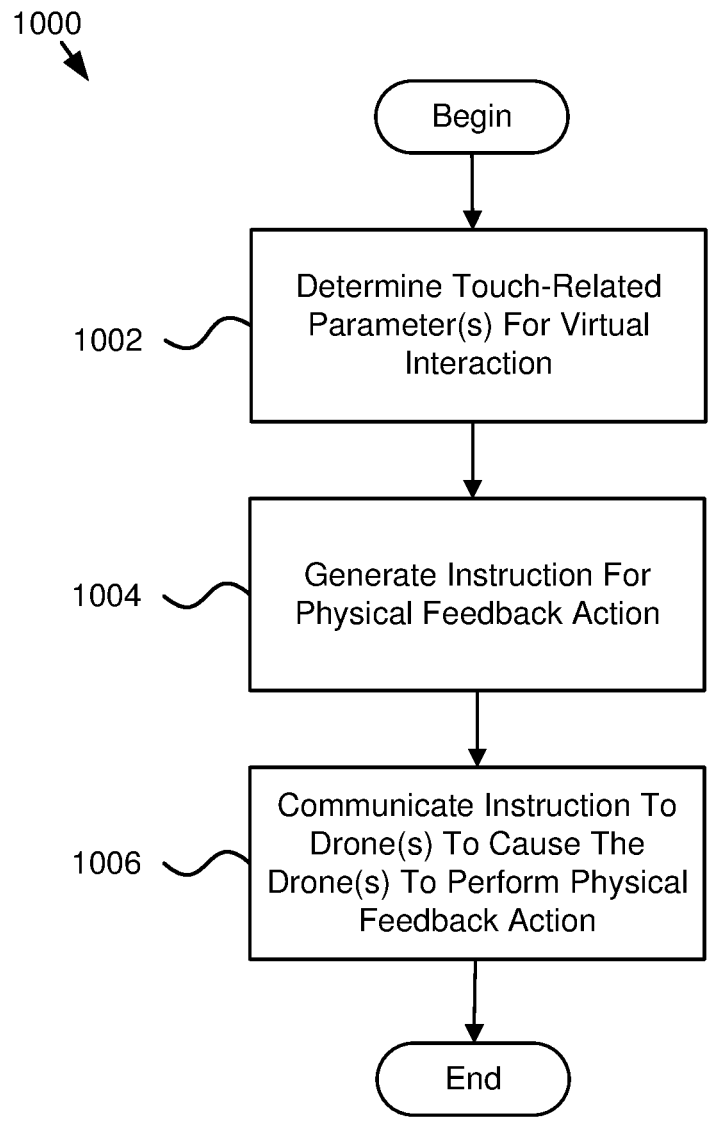
FIG. 10 is a schematic flow chart diagram illustrating one embodiment of a method for providing tactile and force feedback in VR via drone.

FIG. 10 is a schematic flow chart diagram illustrating one embodiment of a method 1000 for providing tactile and force feedback in VR via drone 106. In one embodiment, the method 1000 begins and determines 1002 a touch-related simulation parameter associated with a virtual interaction with a VR object in a virtual reality environment. The method 1000 generates 1004 an instruction configured to cause a physical drone 106 to simulate the virtual interaction using a physical interaction with the physical drone 106 to provide physical feedback on the parameter. The method 1000 communicates 1006 the instruction to the physical drone 106, and the method 1000 ends. In some embodiments, the virtual interaction module 204, the physical action module 206, and/or the drone command module 208 perform one or more of the steps of the method 1000.

Figure 11:
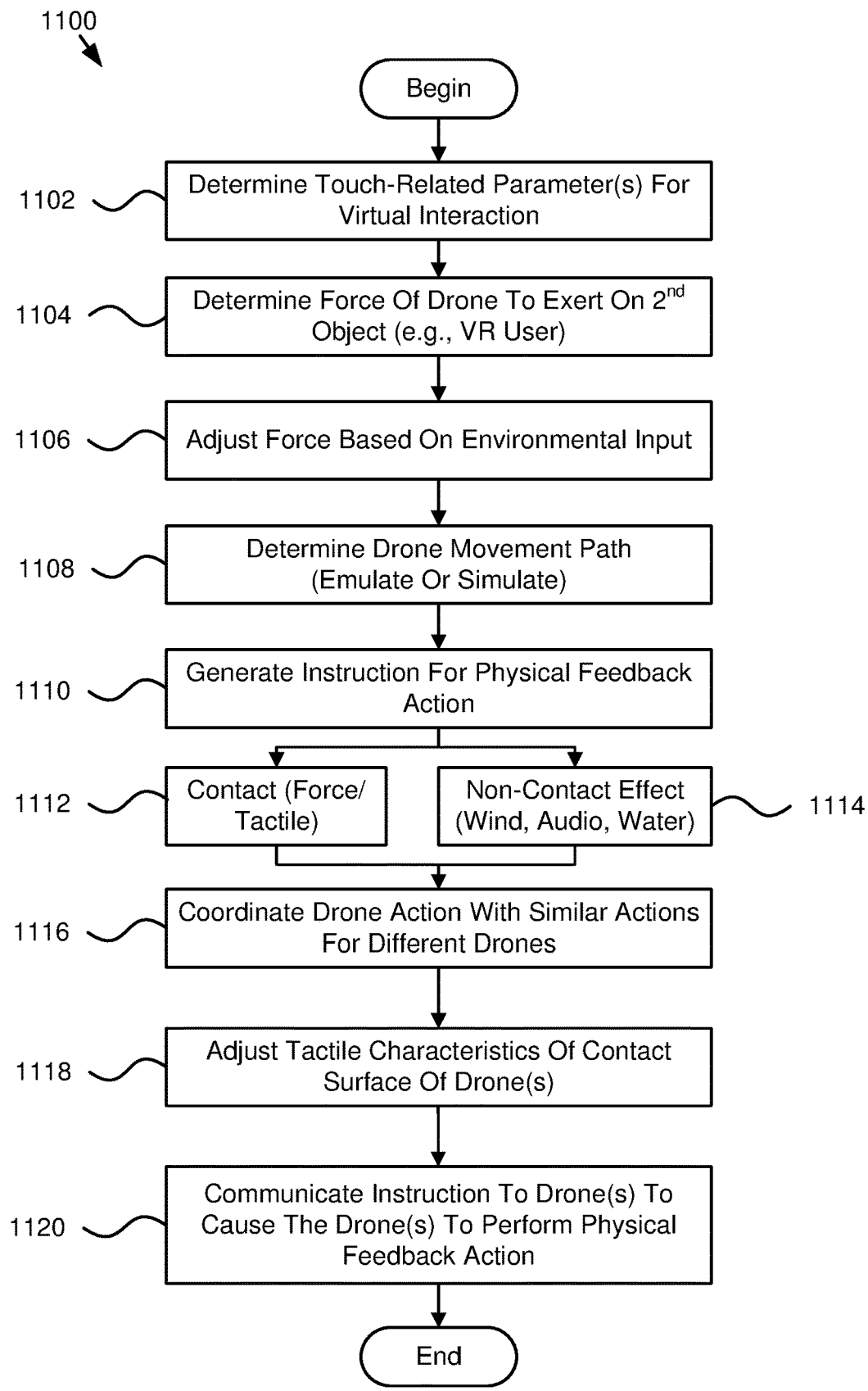
FIG. 11 is a schematic flow chart diagram illustrating another embodiment of a method for providing tactile and force feedback in VR via drone.

FIG. 11 is a schematic flow chart diagram illustrating another embodiment of a method 1100 for providing tactile and force feedback in VR via a drone 106. In one embodiment, the method 1100 begins and determines 1102 a touch-related simulation parameter for a virtual interaction involving a first virtual reality ("VR") object and a second VR object in a virtual reality environment. In certain embodiments, the method 1100 determines 1104 a force parameter for a physical force to be exerted on the second physical object by the physical action of a drone 106. In some embodiments, the method 1100 adjusts 1106 the force parameter for the physical force based on an environmental input selected for the virtual reality environment. In various embodiments, the method 1100 determines 1108 a physical path for the drone 106 that differs from a virtual path of the first VR object.

In certain embodiments, the method 1100 generates 1110 an instruction for a physical action for the drone 106 corresponding to the first VR objects for providing physical feedback via the drone action on a second physical object corresponding to the second VR object, where the physical feedback is based on the touch-related simulation parameter for the virtual interaction. In some embodiments, the method 1100 generates 1110 an instruction for a physical contact action 1112 that exerts a force on the second VR object. In other embodiments, the method 1100 generates 1110 an instruction for a non-contact action 1114 that produces effects such as a wind effects, audio effects, fluid effects, etc.

The method 1100, in some embodiments, coordinates 1116 the physical feedback of the drone 106 with a similar physical action for a different drone 106 or multiple different drones (106a-106n). In various embodiments, the method 1100 adjusts 1118 tactile characteristics of the contact surface of the drone 106 to simulate a characteristic of a substantially continuous-feeling surface corresponding to a virtual surface of the first VR object. The method 1100 communicates 1120 the instruction to the drone 106 to cause the drone 106 to perform the physical action, and the method 1100 ends. In some embodiments, the virtual interaction module 204, the physical action module 206, the drone command module 208, the force module 302, the coordination module 304, the effect module 306, and/or the touch module 308 perform one or more of the steps of the method 1100.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a non-volatile memory comprising code, wherein the code is configured to perform operations comprising:
      determining a parameter associated with a virtual interaction with a virtual reality ("VR") object in a virtual reality environment;
      generating an instruction configured to cause a physical drone to simulate the virtual interaction using a physical interaction with the physical drone to provide physical feedback based on the parameter; and
      communicating the instruction to the physical drone, wherein the physical drone comprises a contact surface at least partially surrounding the physical drone that simulates a substantially continuous-feeling surface that corresponds to a virtual surface of the VR object, wherein the contact surface is coupled to the physical drone with one or more structural members.

2. The apparatus of claim 1, wherein the VR object is a first VR object and the parameter is for a virtual interaction between the first VR object and a second VR object and wherein the operations further comprise determining a force parameter for a physical force to be exerted on a second physical object by the physical action of the physical drone, the second physical object corresponding to the second VR object.

3. The apparatus of claim 2, wherein the second physical object is a physical user corresponding to a virtual reality character in the virtual reality environment.

4. The apparatus of claim 2, wherein the physical feedback of the physical drone is configured to cause the second physical object to interact physically with a physical user corresponding to a virtual reality character in the virtual reality environment.

5. The apparatus of claim 2, wherein the operations further comprise adjusting the force parameter for the physical force in accordance with an environmental input selected for the virtual reality environment.

6. The apparatus of claim 1, wherein the operations further comprise determining a physical path for the physical drone that differs from a virtual path of the VR object.

7. The apparatus of claim 1, wherein the drone comprises an unmanned aerial vehicle.

8. The apparatus of claim 1, wherein the physical feedback is selected from a contact action and a non-contact action.

9. The apparatus of claim 8, wherein the non-contact action comprises a sensory effect selected from wind effects, audio effects and/or fluid effects.

10. The apparatus of claim 1, wherein the operations further comprise coordinating the physical feedback of the physical drone with a similar physical action of a second drone.

11. The apparatus of claim 1, wherein the contact surface is configured to match a contact surface of the VR object.

12. The apparatus of claim 1, wherein the operations further comprise adjusting tactile characteristics of the contact surface.

13. A method comprising:
   determining a parameter associated with a virtual interaction with a virtual reality ("VR") object in a virtual reality environment;
   generating an instruction configured to cause a physical drone to simulate the virtual interaction using a physical interaction with the physical drone to provide physical feedback based on the parameter; and
   communicating the instruction to the physical drones
   wherein the physical drone comprises a contact surface at least partially surrounding the physical drone that simulates a substantially continuous-feeling surface that corresponds to a virtual surface of the VR object, wherein the contact surface is coupled to the physical drone with one or more structural members.

14. The method of claim 13, wherein the VR object is a first VR object and the parameter is for a virtual interaction between the first VR object and a second VR object and further comprising determining a force parameter for a physical force to be exerted on a second physical object by the physical action of the physical drone, the second physical object corresponding to the second VR object.

15. The method of claim 14, further comprising adjusting the force parameter for the physical force in accordance with an environmental input selected for the virtual reality environment.

16. The method of claim 13, further comprising determining a physical path for the physical drone that differs from a virtual path of the VR object.

17. The method of claim 13, wherein the physical feedback is selected from a contact action and a non-contact action, wherein the non-contact action is a sensory effect selected from wind effects, audio effects and/or fluid effects.

18. The method of claim 13, further comprising coordinating the physical feedback of the physical drone with a similar physical action for a second drone.

19. The method of claim 13, further comprising adjusting tactile characteristics of a contact surface to simulate a characteristic of a substantially continuous-feeling surface corresponding to a virtual surface of the VR object.

20. A system comprising:
   one or more physical drones corresponding to a virtual reality ("VR") object;
   one or more processors; and
   a memory storing code that is executable by the one or more processors to:
   determine a parameter associated with a virtual interaction with the VR object in a virtual reality environment;
   generate an instruction configured to cause the one or more physical drones to simulate the virtual interaction using a physical interaction with the one or more physical drones to provide physical feedback based on the parameter; and
   communicate the instruction to the one or more physical drones,
   wherein the physical drone comprises a contact surface at least partially surrounding the physical drone that simulates a substantially continuous-feeling surface that corresponds to a virtual surface of the VR object, wherein the contact surface is coupled to the physical drone with one or more structural members.

* * * * *